March 8, 1960　　J. GIESEN ET AL.　　2,927,944
PROCESS FOR SEPARATION OF CYCLOHEXANOL AND CYCLOHEXANONE
FROM REACTION MIXTURE OBTAINED
BY OXIDATION OF CYCLOHEXANE
Filed Oct. 22, 1957
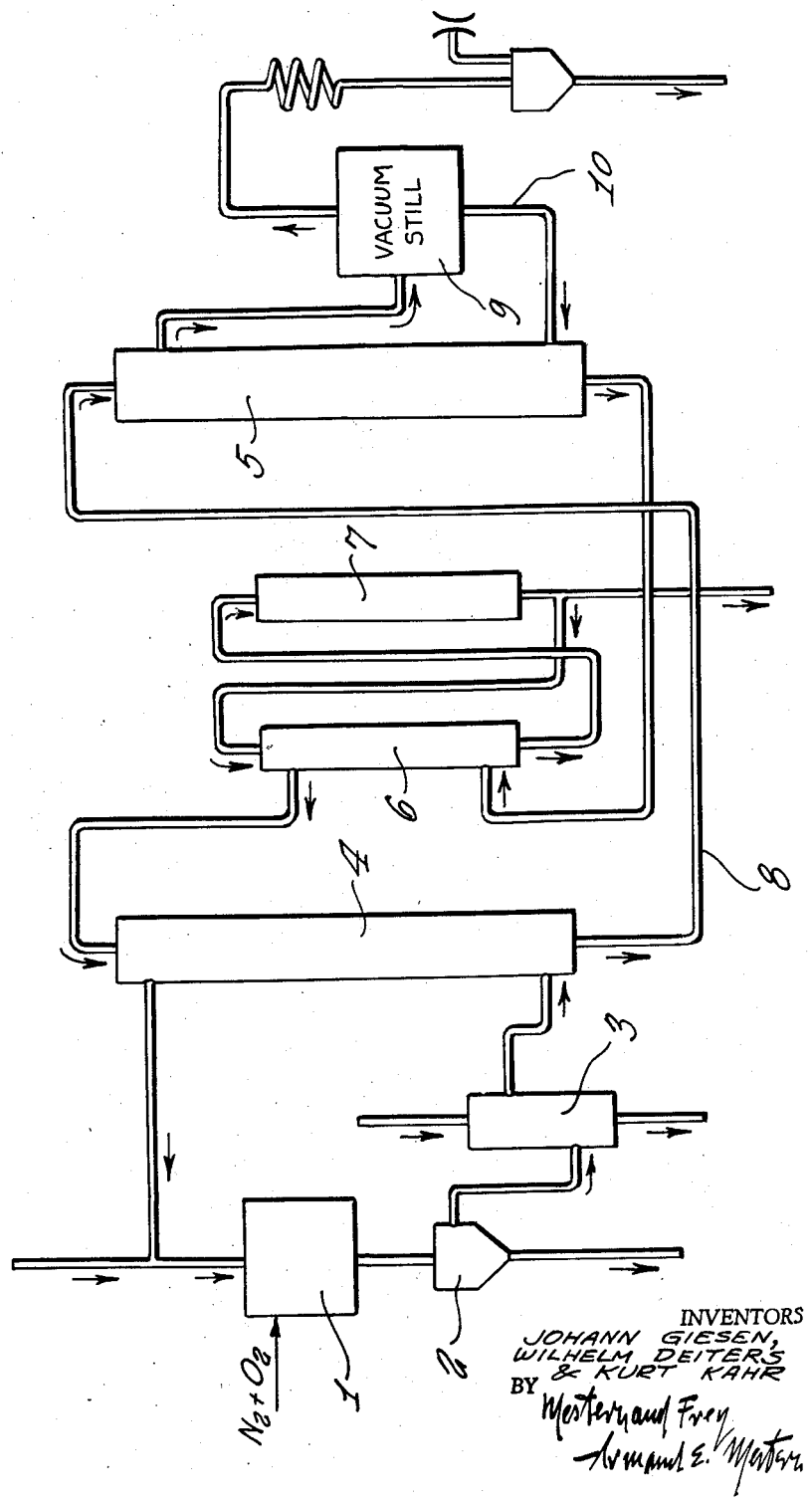
INVENTORS
JOHANN GIESEN,
WILHELM DEITERS
& KURT KAHR
BY United States Patent Office 2,927,944
Patented Mar. 8, 1960

2,927,944

PROCESS FOR SEPARATION OF CYCLOHEXANOL AND CYCLOHEXANONE FROM REACTION MIXTURE OBTAINED BY OXIDATION OF CYCLOHEXANE

Johann Giesen, Haldenstein, near Chur/Grb., Wilhelm Deiters and Kurt Kahr, Chur/Grb., Germany, assignors to Inventa A.G. fur Forschung und Patentverwertung, Zurich, Switzerland Application October 22, 1957, Serial No. 691,705

Claims priority, application Switzerland October 24, 1956

5 Claims. (Cl. 260—586)

The present invention relates to a process for obtaining mixtures of cyclohexanol and cyclohexanone from the reaction mixture of the cyclohexane oxidation by extraction with selective solvents.

When cyclohexane is oxidized by means of oxygen or air, the most valuable products obtained are cyclohexanone and cyclohexanol. Depending on the reaction conditions, other materials obtained are acids, esters, and large amounts of unreacted cyclohexane. The separation of these ingredients commonly is accomplished by driving off the cyclohexane by distillation with or without steam. The residue consists of esters, acids, cyclohexanol and cyclohexanone. This residue usually is saponified with alkalies so that the acids present and those formed by saponification are converted into their alkali salts. Simultaneously, the cyclohexanol yield is increased thereby. Subsequently, the cyclohexanol-cyclohexanone mixture is separated by fractionation. The residual acids can be recovered in a known manner from the alkali salts.

The greatest disadvantage of this method lies in the distillation of cyclohexane, particularly because of increased formation of condensation products of cyclohexanone. Furthermore, esterification of the acids present is likely to occur. In addition, any distillation process on a production scale is uneconomical.

The present invention is based on the inventors' discovery that the cyclohexanol-cyclohexanone mixture can be separated from the reaction mixture of the cyclohexane oxidation without distilling the cyclohexane. This is accomplished in two steps by (a) extraction of the reaction mixture with a solvent which is selective for cyclohexanone-cyclohexanol mixtures; and (b) extraction of the cyclohexanol-cyclohexanone-containing solvent with a specific solvent for cyclohexanol-cyclohexanone which is not miscible with the solvent used in the first step.

Subsequently, the cyclohexanol-cyclohexanone is distilled from the second solvent.

It is advantageous to precede the above extraction by subjecting the reaction mixture of the cyclohexane oxidation to an alkaline extraction. The reaction mixture consists of cyclohexane, acids, esters, cyclohexanol and cyclohexanone; the alkali removes the acids. Said acids can be recovered from the aqueous salt solution by acidification. The acids can also be removed by treating the mixture, in a known manner, with ion-exchangers. The remaining mixture, free of acids, is subjected to the first extraction, whereby as solvent a medium is employed which specifically dissolves only the cyclohexanone-cyclohexanol. Examples for such solvents are the alkyl-ammonium salts and ammonium salts of alkyl-aryl sulfonic acids and arylsulfonic acids, and sodium toluene sulfonate or sodium xylene sulfonate, furthermore aryl sulfonic acid and ethanolamine. These solvents are enriched with the cyclohexanone-cyclohexanol mixture during the extraction process.

In the second step, the cyclohexanone-cyclohexanol mixture is extracted from the solvent in a countercurrent system by means of another solvent which is a specific solvent for that mixture, but is immiscible with the first extractant, and which preferably has a much higher boiling point than the cyclohexanol-cyclohexanone mixture. An example for such solvents are esters of phthalic acid, e.g. dibutyl phthalate. The latter can then be recovered by simple distillation.

The residue from the first extraction consists substantially of esters and unreacted cyclohexane. It is possible to return this residue into the oxidation step, since the known conditions of equilibrium permit, under certain conditions, the splitting of the esters directly, whereby the anol is converted into anone.

If, however, partial or entire removal of the esters is desired, they can be separated from the cyclohexane by treating them, e.g., with 80% sulfuric acid which dissolves the esters. The latter can be extracted from the sulfuric acid with a suitable solvent, and the sulfuric acid can be returned into the process. The extracted esters, after removal of the solvent, can be saponified in the known manner. The split-products can be recovered, e.g., by means of distillation. The cyclohexanol thus obtained can be treated in the same manner as in the main extraction process, i.e., it is extracted first with alkylaryl or arylsulfonic salts and then with esters of low volatility. After this, an alkaline saponification step can be added, whereby again a certain amount of cyclohexanol is obtained after acidification. Simultaneously, organic acids are obtained through saponification of the esters.

Obviously, the reaction mixture derived from the oxidation step must be separated first from the reaction water. The mixture then can be subjected, immediately or after cooling, to the first extraction. If an alkaline deacidification precedes this, the conditions should be mild enough not to effect condensation reactions.

The process according to the invention will now be described more fully in a number of examples with reference to the accompanying diagrammatic drawing. However, it should be understood that these examples are given by way of illustration and not of limitation, and that many changes in the details can be made without departing from the spirit of the invention.

*Example 1*

500 cc. cyclohexane containing 250 g. cyclohexanol and 250 g. cyclohexanone are extracted in a scrubbing tower (Intensiv-Waschturm) and in a countercurrent with an equal quantity of a 20% aqueous solution of the ethanol ammonium salt of toluene-sulfonic acid. After separation of the entirely clear layers, the extract is steam-distilled. The distillate is an anol-anone-water mixture which separates into two layers. Because of the increasing amounts of water with decreasing concentration, the average water requirements relative to the quantities of anol-anone mixture in the total distillate amount to approximately 6 times the quantity. After exhaustive extraction, 475 g. (95%) of anol and anone are recovered in this manner. Only in the distillation forerun a few cubic centimeters of cyclohexane are found.

*Example 2*

In 500 cc. cyclohexane, 125 g. anol and 125 g. anone are dissolved. This mixture is exhaustively extracted in the same apparatus as described in Example 1, using 2,000 cc. of a 40% aqueous solution of sodium xylene sulfonate. The extract is clarified by means of a separator and is then treated in a like washing process countercurrently with 2,000 cc. tricresyl phosphate. This extract, also clarified, then is heated in a vacuum still at 2 mm. pressure to a temperature at which the cyclohexanol-cyclohexanone mixture distills in its entirety. In this process, without rectification, two distinct fractions distill, namely at 50° C. and at 55° C. In this manner, a total of 230 g. of the original products are recovered (92%).

*Example 3*

50 g. anol and 50 g. anone are dissolved in 5,000 cc. cyclohexane and extracted in the above-described apparatus with 2,500 cc. of an aqueous solution of sodium toluene sulfonate. When fully clear, the sulfonate extract is extracted intensively and countercurrently with 1,000 cc. dibutyl phthalate. This extract is left standing until entirely clear and then is freed from the anol-anone mixture by topping at 2 mm. pressure. This yields 88 g. distillate (88%). By returning both solvents into the process, the latter can be repeated many times successfully by addition of fresh anol-anone mixture.

*Example 4*

In a continuous system, as illustrated in the drawing, 14,085 g. per hour of cyclohexane are oxidized at 20 atm. and 160° C. in the presence of a catalyst. Oxidation is accomplished in reaction tube 1 with a nitrogen-oxygen mixture containing 2.5 percent oxygen. After 96 g. reaction water have accumulated in separator vessel 2, the acids (138 g. as sodium salts) are washed out with dilute sodium hydroxide in scrubbing tower 3. The remaining cyclohexane mixture then enters a scrubbing tower 4 (Intensiv-Waschturm), in which it is extracted with 10,000 cc. of a 25% aqueous solution of sodium toluene sulfonate. The remaining 13,216 g. cyclohexane are returned, and the mixture of anol-ester formed is allowed to remain with the cyclohexane, so that in a continuous process a constant ester-level is formed. Through the addition of 869 g. per hour of fresh cyclohexane, the hourly throughput of 14,085 g. is maintained.

In order to extract the anol-anone mixture from the enriched sulfonate solution, the latter is washed in a similar scrubbing tower 5 with 3,000 cc. dibutyl phthalate. Subsequently, the remaining sulfonate solution is washed in tower 6 with 5,000 cc. of an anol-ester mixture, which is formed in the cyclohexane oxidation to remove small quantities of dibutyl phthalate. This ester mixture is cycled and periodically cleaned in tower 7. The enriched dibutyl phthalate goes from scrubbing tower 4 through pipe 8 into scrubbing tower 5 and from there into vacuum still 9. There, it is heated at 2 mm. pressure high enough so that the entire amount of anone and anol distills. Thereafter, the dibutyl phthalate is conducted through pipe 10 back into scrubbing tower 5. The 744 g. of products obtained contain 42% anol and 58% anone.

What we claim is:

1. A process for separating cyclohexanol and cyclohexanone from the reaction mixture obtained by the oxidation of cyclohexane with oxygen, which comprises extracting from said reaction mixture in a first extraction step a mixture of cyclohexanone and cyclohexanol by means of a first solvent selective for cyclohexanone and cyclohexanol in the presence of cyclohexane and esters of cyclohexanol, selected from the group consisting of aqueous sodium xylene sulfonate and aqueous sodium toluene sulfonate; and thereafter extracting from said first solvent in a second step said mixture of cyclohexanone and cyclohexanol by means of a second solvent which also is selective for cyclohexanone and cyclohexanol, but is immiscible with said first solvent, said second solvent being selected from the group consisting of tricresyl phosphate and dibutyl phthalate; and finally recovering the cylohexanone-cyclohexanol mixture from said second solvent by distillation.

2. The process according to claim 1, wherein in the extraction in both the first and second steps the extraction agents are brought in contact with the mixtures to be extracted in countercurrent flow.

3. The process according to claim 1, wherein free acids present in the reaction mixture are removed, prior to the extraction, by an alkali extraction.

4. The process according to claim 1, wherein esters and acids present in the reaction mixture are removed, prior to the extraction, by extraction with concentrated sulfuric acid.

5. The process according to claim 1, wherein after the first extraction of the cyclohexanol-cyclohexanone mixture the remaining mixture is treated with sulfuric acid of approximately 80 percent concentration.

References Cited in the file of this patent

UNITED STATES PATENTS

| | | |
|---|---|---|
| 2,410,642 | Farkas et al. | Nov. 5, 1946 |
| 2,479,041 | Elgin | Aug. 16, 1949 |
| 2,552,670 | Fleming | May 15, 1951 |
| 2,609,395 | Dougherty et al. | Sept. 2, 1952 |
| 2,806,889 | Gottesman et al. | Sept. 17, 1957 |